Oct. 12, 1943.    N. L. SIMMONS    2,331,739
ANTI-STATIC PHOTOGRAPHIC FILM
Filed Jan. 10, 1941    2 Sheets-Sheet 1
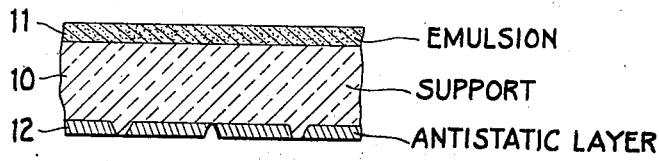
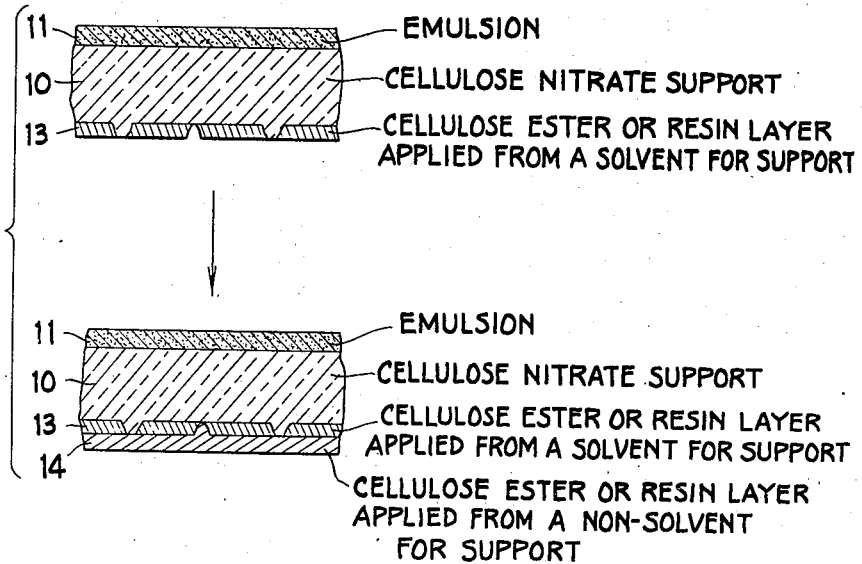
NORWOOD L. SIMMONS
INVENTOR

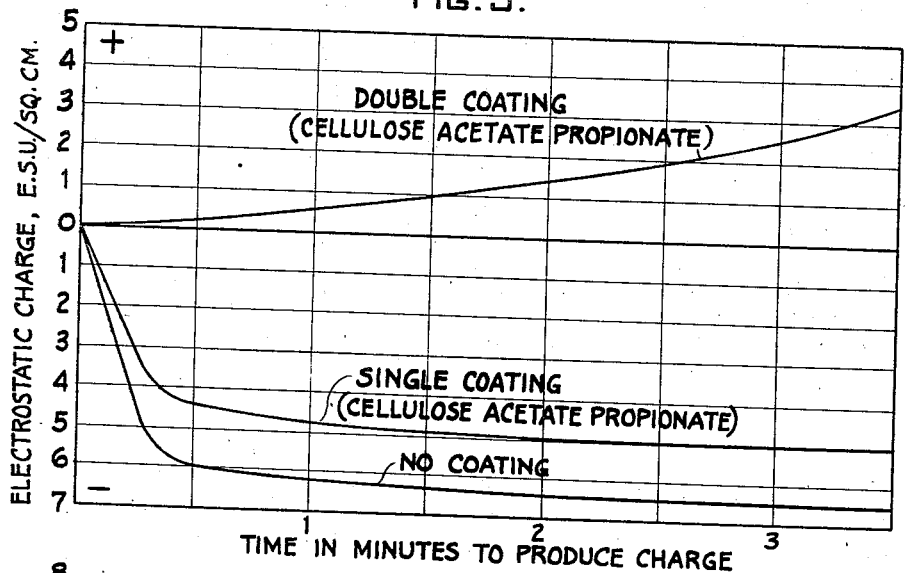
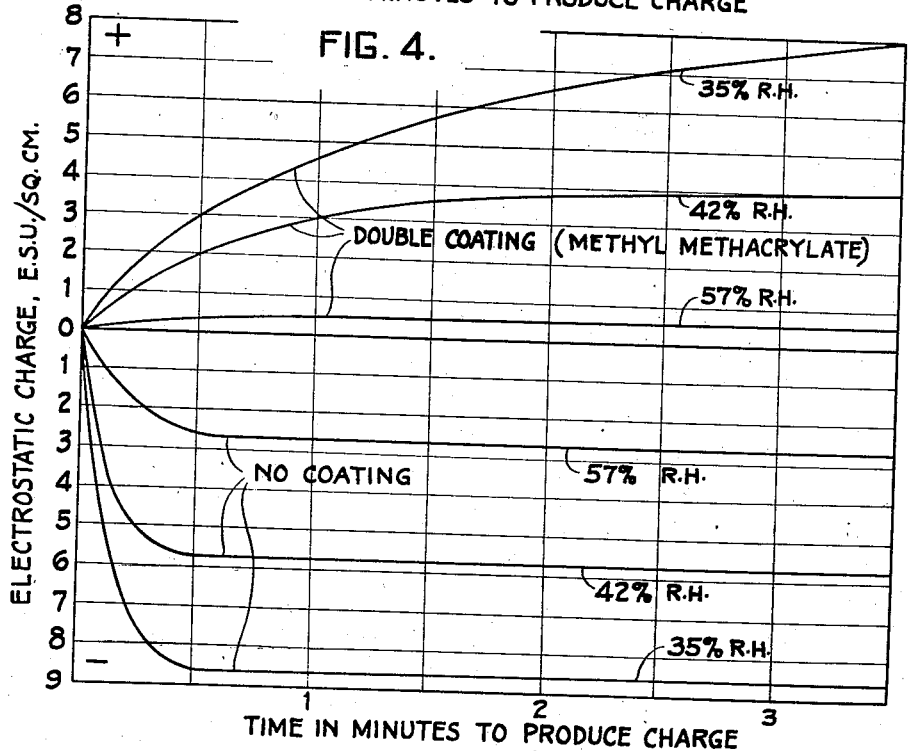

Patented Oct. 12, 1943

2,331,739

UNITED STATES PATENT OFFICE 2,331,739

ANTISTATIC PHOTOGRAPHIC FILM

Norwood L. Simmons, Rochester, N. Y., assignor to Eastman Kodak Company, Rochester, N. Y., a corporation of New Jersey Application January 10, 1941, Serial No. 373,971

20 Claims. (Cl. 95—9)

This invention relates to photographic film and more particularly to a film protected against static.

Considerable trouble has been experienced in the manufacture and use of photographic film due to the accumulation of electrical charges on the film. These electrical charges are known as static and are produced by the friction of the film moving over rollers or other surfaces. Manifestations of these charges are irregular fogged patterns in an emulsion of a film which has been developed. These static effects are particularly noticeable in a film provided with a cellulose nitrate support which will become sufficiently electrified during manufacture or use that the discharge of the stored up static electricity will adversely affect the film. Attempts have been made to overcome static in films by the application of various layers to the film. These layers have in general consisted of materials designed to dissipate the electrical charges by providing the film with a conducting surface. The usual procedure has been to coat a film with a solution of the material giving the static protection, the solvent of which attacks the film support in a manner such that the antistatic layer is anchored firmly thereto.

I have found that the application of these known methods and materials for protecting film against static are not completely successful. When a film is coated with one of these materials in a known manner it is discovered that while static protection might be adequate for films of low sensitivity, more sensitive film emulsions are adversely affected and in some cases protection is not even adequate for low speed emulsions. This I believe is due to the fact that certain areas of the film surface are not covered by the conducting material. This situation is illustrated by Fig. 1 whereby it is shown that the electrifiable surface of a support 10, is not completely covered by the layer 12 intended to give static protection by methods previously known. I have also found that the application of thicker single layers of known static protecting materials does not alleviate this condition and besides it is not practical to do so in the best interests of economy and resultant film quality.

The principal object of this invention is to provide a light sensitive photographic film with backing layers applied in such a manner that the rear surface is completely coated.

Another object, and this constitutes the preferred embodiment of my invention, is to provide a light sensitive photographic film, having a cellulose nitrate support, with backing layers which confer complete protection against static.

These objects are accomplished in the present invention by applying a backing layer to a sensitive film from a solvent for the support, and applying a second backing layer from a solvent for the first layer but not for the support.

In the accompanying drawings, Fig. 2 shows sectional views of a film provided with static protecting layers according to my invention. Fig. 1 is intended to illustrate a film provided with a backing layer by known methods and of known materials, the result being as I have ascertained, inadequate protection against static since areas of the support protruding through the layer or irregularities in the backing layer itself, provide points of discharge for static. Figs. 3 and 4 show graphical comparisons of electrostatic measurements on uncoated film, with single layer and double layer coated films of the invention.

The method I use for providing a film with a satisfactory antistatic layer is to coat the back surface of a film with a thin layer of a cellulose ester or a synthetic resin, the electrifiable characteristics of which are different from those of the film support. For instance as illustrated in Fig. 2 of the drawings, a photographic film having an emulsion layer 11 and a cellulose nitrate support 10 is coated with a discrete layer 13 of a cellulose ester or a resin. The solvent used for coating this layer is one which attacks the support anchoring the layer firmly thereto. However, this layer does not give adequate static protection, as may be seen in the first stage Fig. 2 since areas capable of discharging static are still present. I then apply a second layer of cellulose ester or resin 14, as shown in the second stage of Fig. 2 from a solvent which attacks the first layer but does not attack the support. The second layer is thereby firmly anchored to the first and is more uniformly distributed over the back of the film than it would be had I coated this second layer from the same solvent as the first, there now remaining no areas capable of discharging static.

The following examples further illustrate the manner of operation of the present invention but are not to be considered as limiting the scope of my invention.

Example 1

A film support consisting of cellulose nitrate is coated with a thin layer of fully esterified cellulose acetate propionate, 16% propionyl and 32% acetyl, using a 1.5% dope of the ester in a solvent mixture of 50% acetone and 50% ethylene dichloride. A second layer of the cellulose acetate propionate is applied from a solvent solution not attacking the support. This consists of a 2½% solution of cellulose acetate propionate in ethylene dichloride. The light sensitive emulsion layer is then applied to the opposite side of the support using any suitable subbing technique.

*Example 2*

A film support consisting of cellulose nitrate is coated with a thin layer of cellulose acetate, 43.2% acetyl, from a 1½% solution of the ester in a solvent mixture of 50 parts of ethylene dichloride and 50 parts of acetone. A second layer of cellulose acetate is applied from a solvent solution not attacking the support, such as a 2% solution of the cellulose acetate in ethylene dichloride. A light sensitive emulsion layer is then applied to the opposite side of the support using any suitable subbing technique. I have found that satisfactory antistatic protection is reached if any cellulose acetate which is soluble in a nonsolvent for the support is used for the backing layers. A cellulose acetate, 32% acetyl, may be coated from 1½% solution of 20 parts methyl Cellosolve, 20 parts methanol and 60 parts acetone onto a cellulose nitrate support followed by a second layer of a cellulose acetate, 23.8% acetyl, applied from 1½% solution of the cellulose acetate in a mixture of 27% water, 27% methyl Cellosolve and 46% ethyl alcohol.

*Example 3*

In a manner similar to that described in Example 2 cellulose tripropionate or cellulose tributyrate are applied from a 1½% solution in a solvent mixture of 50% ethylene dichloride and 50% acetone followed by a coating from 1½% solution of the cellulose ester in ethylene dichloride.

*Example 4*

A cellulose nitrate film support is coated with a layer of polyvinyl acetaldehyde acetal (11% vinyl alcohol, 87% vinyl acetal and 2% vinyl acetate) prepared as described in U. S. Patent 2,188,344 granted January 10, 1940, from a solvent mixture of equal parts of ethylene dichloride and acetone or, 80% ethylene dichloride and 20% ethyl alcohol, or 80% ethylene dichloride and 20% methanol followed by a second coating of the resin from ethylene dichloride. The concentration of the resin in the coating solutions is about 3%.

Instead of the acetaldehyde acetal resin I may use other polymerized vinyl resins such as styrene-methylmethacrylate and styrene-methylacrylate resins the preparations of which are described in British Patent 371,396, accepted April 14, 1932. The solvent combinations above described are also suitable for coating these resins in the manner of my invention. Similarly, I may use polymeric esters of acrylic and α-alkacrylic acids.

*Example 5*

A cellulose nitrate film base is coated with a thin layer of polymethylmethacrylate resin from a 1½% solution of the resin in a mixture of equal parts of acetone and ethylene dichloride followed by a second coating of the resin from a 1½% solution of the resin in ethylene dichloride.

The film provided with the antistatic layers of the invention, as described in Example 1, was tested to ascertain the tendency to accumulate and discharge static. Electrostatic measurements showed (Fig. 3) that the film coated with a single layer of cellulose ester tends to electrify negatively, a high charge being accumulated shortly after subjection to static development treatment by friction. After the application of the second coating from a solvent for the first layer but not for the support, the film tends to electrify positively at a very low rate. These tests compared with those of the uncoated cellulose nitrate support illustrate the superiority of the antistatic layers of the invention, as applied to cellulose esters. In Fig. 4 electrostatic measurements made on a film protected against static, as described in Example 5, are shown in relation to the time required to produce a charge. A nitrate support not coated with the resin layers of the invention rapidly accumulates a maximum charge at the three humidities given. The film coated with double layers of resin has a low rate of positive electrification at the three humidities, the maximum values being reached only after prolonged static development treatment by friction.

The above illustrations conclusively prove that coating an electrifiable nitrate support with double layers of cellulose esters or resins is a necessity in order to completely protect a sensitive film against static. In addition, by coating a support with the materials I suggest not only is negative electrification avoided but the rate of electrification is very low. Therefore, films provided with antistatic layers in the manner of my invention have a low rate of electrification and are to be preferred over a film showing a higher rate of electrification even though the latter may ultimately reach a lower charge when fully electrified. This factor is important in view of the limited length of time of contact of film with a given surface during the handling operations of manufacture, which period is generally insufficient to produce the maximum charge.

The foregoing examples illustrate my improved technique whereby an electrifiable cellulose nitrate film support is provided with two layers of a cellulose ester or resin protecting the film from static. It is to be noted that while for these examples I have chosen cellulose nitrate supports coated with cellulose esters or resins I am not limited to the use of these materials. Other supports such as synthetic resins capable of assuming a static charge which adversely affects sensitive photographic film may thus be protected. As constituents of the antistatic layers I prefer a material capable of being electrified to a charge opposite to that of the support. Such materials are cellulose esters, cellulose mixed esters, or synthetic resins. The solvents which have served to illustrate the manner of application of the invention in no way constitute the only compounds which may be used. The only stipulation is that the solvents or mixed solvents used for the application of the first backing layer to an electrifiable support must be those which attack the support and of course in which the backing material is soluble. For the coating of the second layer, the cellulose ester or resin of which may or may not be identical to that of the first layer, those solvents are used which attack the first backing layer but do not attack the support.

One feature of my invention which at first sight may not be apparent is the fact that practically completely esterified cellulose esters, such as cellulose triacetate, acetyl 43.2%, serve admirably as antistatic backing layers. Hitherto the cellulose esters in most common use have been incompletely esterified esters, these being preferred, apparently, on account of the poor solubility characteristics of completely esterified esters. Completely esterified cellulose esters have solubility in organic solvents in which cellulose nitrate is insoluble, their solubility being practically entirely limited to chlorinated hydrocarbons and for that reason are particularly suitable for use in my invention. I merely dissolve the cellulose esters in a solvent such as ethylene dichloride and add to this solution one or more other solvents which will attack the support and apply the first coating to the support followed by a second coating of the cellulose ester from a solvent for the first coating.

While the preferred embodiment of my invention constitutes providing a film support, such as cellulose nitrate, with static protecting layers, I may however use a film having the same or a different cellulose ester support and provide this film with double backing layers for the purpose of increasing resistance to surface scratch or abrasion. In a similar manner my two layer coating technique may be used to provide a film with a backing of low water susceptibility and low tendency to fingerprint.

Having thus described my invention it is to be understood that the above-mentioned process and materials in no way limit the scope of my invention and said invention is to be understood as being limited only by the scope of the appended claims.

What I claim is:

1. A light-sensitive photographic film which comprises a cellulose ester support, an emulsion layer, and on the opposite side of the support, two layers of a synthetic colloidal film forming material of different composition than the support, the first layer having been applied from a solution of a solvent which attacks the support, and the second layer having been applied from a solution of a solvent which attacks the first layer but not the support.

2. A light-sensitive anti-static photographic film which comprises a cellulose nitrate support, an emulsion layer, a backing of a film forming material having electrifiable characteristics different from those of the film support and coated from a solvent which attacks the support, and a second layer of a film forming material coated from a solvent which attacks the first layer but not the support.

3. A light-sensitive anti-static photographic film which comprises a cellulose nitrate support, an emulsion layer, a backing of a polymerized ester of an acid selected from the group consisting of acrylic and α-alkacrylic acids coated from a solvent which attacks the support, and a second layer of a polymerized ester of an acid selected from the group consisting of acrylic and α-alkacrylic acids coated from a solvent which attacks the first layer but not the support.

4. A light-sensitive anti-static photographic film which comprises a cellulose nitrate support, an emulsion layer, a backing of methyl methacrylate coated from a solvent which attacks the support, and a second layer of methyl methacrylate coated from a solvent which attacks the first layer but not the support.

5. A light-sensitive anti-static photographic film which comprises a cellulose nitrate support, an emulsion layer, a backing of methyl methacrylate coated from a solvent mixture of equal parts of acetone and ethylene dichloride and a second layer of methyl methacrylate coated from ethylene dichloride.

6. A light-sensitive anti-static photographic film which comprises a cellulose nitrate support, an emulsion layer, a backing of a cellulose ester coated from a solvent which attacks the support, and a second layer of a cellulose ester coated from a solvent which attacks the first layer but not the support.

7. A light-sensitive anti-static photographic film which comprises a cellulose nitrate support, an emulsion layer, a backing of a fully esterified cellulose ester coated from a solvent which attacks the support, and a second layer of a fully esterified cellulose ester coated from a solvent which attacks the first layer but not the support.

8. A light-sensitive anti-static photographic film which comprises a cellulose nitrate support, an emulsion layer, a backing of a fully esterified cellulose acetate coated from a solvent which attacks the support, and a second layer of a fully esterified cellulose acetate coated from a solvent which attacks the first layer but not the support.

9. A light-sensitive anti-static photographic film which comprises a cellulose nitrate support, an emulsion layer, a backing of fully esterified cellulose acetate coated from a solvent mixture of equal parts of acetone and ethylene dichloride, and a second layer of fully esterified cellulose acetate coated from ethylene dichloride.

10. A light-sensitive anti-static photographic film which comprises a cellulose nitrate support, an emulsion layer, a backing of a polymerized vinyl resin coated from a solvent which attacks the support, and a second layer of a polymerized vinyl resin coated from a solvent which attacks the first layer but not the support.

11. A light-sensitive anti-static photographic film which comprises a cellulose nitrate support, an emulsion layer, a backing of a polyvinyl acetal resin coated from a solvent which attacks the support, and a second layer of a polyvinyl acetal resin coated from a solvent which attacks the first layer but not the support.

12. A light-sensitive anti-static photographic film which comprises a cellulose nitrate support, an emulsion layer, a backing of a polyvinyl acetaldehyde acetal resin containing 11 per cent vinyl alcohol, 87 per cent vinyl acetal and 2 per cent vinyl acetate, coated from a solvent which attacks the support, and a second layer of a polyvinyl acetaldehyde acetal resin containing 11 per cent vinyl alcohol, 87 per cent vinyl acetal and 2 per cent vinyl acetate, coated from a solvent which attacks the first layer but not the support.

13. A light-sensitive anti-static photographic film, which comprises a cellulose nitrate support, an emulsion layer, a backing of a polyvinyl acetaldehyde acetal resin containing 11 per cent vinyl alcohol, 87 per cent vinyl acetal and 2 per cent vinyl acetate, coated from a solvent mixture of equal parts of acetone and ethylene dichloride, and a second layer of a polyvinyl acetaldehyde acetal containing 11 per cent vinyl alcohol, 87 per cent vinyl acetal and 2 per cent vinyl acetate, coated from ethylene dichloride.

14. The process of making a light-sensitive photographic film which comprises coating a cellulose ester support with a photographic emulsion layer, coating on the opposite side of the support a solution of a synthetic colloidal film forming material of different composition than the support in a solvent which is also a solvent for the support, and coating a second solution of a synthetic colloidal film forming material of different composition than the support in a solvent which attacks the first layer but not the support.

15. The process of making a light-sensitive anti-static photographic film which comprises coating a cellulose nitrate support with a photographic emulsion layer, coating on the opposite side of the support a solution of a film forming material having electrifiable characteristics different from those of the support in a solvent which is also a solvent for the support, and coating a second solution of a film forming material having electrifiable characteristics different from those of the support in a solvent which attacks the first layer but not the support.

16. The process of making a light-sensitive anti-static photographic film which comprises coating a cellulose nitrate support with a photographic emulsion layer, coating on the opposite side of the support a solution of a polymerized ester of an acid selected from the group consisting of acrylic and α-alkacrylic acids in a solvent which is also a solvent for the support, and coating a second solution of a polymerized ester of an acid selected from the group consisting of acrylic and α-alkacrylic acids in a solvent which attacks the first layer but not the support.

17. The process of making a light-sensitive anti-static photographic film which comprises coating a cellulose nitrate support with a photographic emulsion layer, coating on the opposite side of the support a solution of methyl methacrylate in a solvent which is also a solvent for the support and coating a second solution of methyl methacrylate in a solvent which attacks the first layer but not the support.

18. The process of making a light-sensitive anti-static photographic film which comprises coating a cellulose nitrate support with a photographic emulsion layer, coating on the opposite side of the support a solution of a cellulose ester in a solvent which is also a solvent for the support, and coating a second solution of cellulose ester in a solvent which attacks the first layer but not the support.

19. The process of making a light-sensitive anti-static photographic film which comprises coating a cellulose nitrate support with a photographic emulsion layer, coating on the opposite side of the support a solution of a fully esterified cellulose ester in a solvent which is also a solvent for the support, and coating a second solution of a fully esterified cellulose ester in a solvent which attacks the first layer but not the support.

20. The process of making a light-sensitive anti-static photographic film which comprises coating a cellulose nitrate support with a photographic emulsion layer, coating on the opposite side of the support a solution of a polymerized vinyl resin in a solvent which is also a solvent for the support, and coating a second solution of a polymerized vinyl resin in a solvent which attacks the first layer but not the support.

NORWOOD L. SIMMONS.